United States Patent Office 2,919,276
Patented Dec. 29, 1959

2,919,276

17β BROMO-17-DESOXYYOHIMBIC ACID

Patrick A. Diassi, Westfield, N.J., assignor to Olin Mathieson Chemical Corporation, New York, N.Y., a corporation of Virginia No Drawing. Application December 10, 1957
Serial No. 701,723

2 Claims. (Cl. 260—287)

This invention relates to new compounds, and more particularly to 17β-bromo alkaloids, which may be represented by bases of the structural formula

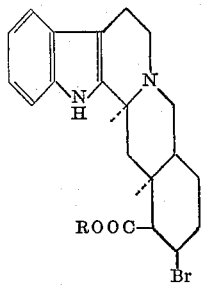

wherein R is hydrogen or lower alkyl and acid addition salts thereof. These compounds have been found to be physiologically active substances which possess adrenolytic activity. Thus the compounds of this invention can be used in lieu of know adrenolytic compounds such as phentolamine, 2 - N[p' - tolyl - N - (m'-hydroxyphenyl)-aminomethyl]-imidazoline, in the treatment of peripheral vascular diseases, or the diagnosis of pheochromocytoma, for which purpose they are administered orally or parenterally in the same manner as phentolamine.

The 17β-bromo compounds of this invention are prepared by the process of this invention which essentially comprises interacting the β-lactone of yohimbic acid (preparable as described in my U.S. application, Serial No. 673,170, filed July 22, 1957 now U.S. Patent No. 2,861,075) with an alkali metal bromide (e.g. lithium bromide), the reaction preferably being conducted in an organic solvent for the lactone at an elevated temperature. The process yields 17β-bromo-17-desoxyyohimbic acid (R is hydrogen) which can be esterified in the usual manner as by treatment with a diazo(lower)alkane (e.g. diazomethane and diazoethane) or a hydrogen halide in a lower alkanol solution.

The free bases initially formed can be converted to their acid-addition salts, particularly the non-toxic acid-addition salts, in the usual manner by treating with the desired acid. Among the suitable acids utilizable in this process may be mentioned inorganic acids, such as the hydrohalic acids (e.g. hydrochloric and hydrobromic acid), sulfuric acid, phosphoric acid, and nitric acid; and organic acids, such as tartaric, succinic, oxalic, maleic, and citric acid.

The following examples illustrate the invention:

EXAMPLE 1

*17β-bromo-17-desoxyyohimbic acid hydrobromide*

To a solution of 539 mg. (6.2 millimole) of lithium bromide in 20 ml. of acetone, 500 mg. (1.55 millimole) of yohimbic acid β-lactone is added and the mixture refluxed under nitrogen. During the first fifteen minutes of heating, the lactone slowly goes into solution and a short time later a precipitate begins to separate. The mixture is refluxed for two hours, cooled and the precipitate begins to separate. The mixture is refluxed for two hours, cooled and the precipitate filtered and washed with acetone. The 17β-bromo-17-desoxyyohimbic acid is converted to the hydrobromide salt by dissolving it in 15 ml. of water and adding a few drops of 48% hydrobromic acid. It is crystallized from methanol-water, yield about 490 bg. (63%), M.P. about 283–286° C.

*Analysis.*—Calcd. for $C_{20}H_{24}N_2O_2Br_2 \cdot H_2O$ (502.27): C, 47.82; H, 5.22; N, 5.58; Br, 31.82. Found: C, 48.10; H, 5.35; N, 5.50; Br, 31.30. Neutral equivalent 482 (HClO4 titration).

EXAMPLE 2

*17β-bromo-17-desoxyyohimbine*

274 mg. of 17β-bromo-17-desoxyyohimbic acid hydrobromide is suspended in 20 ml. of methanol and treated with an excess of ethereal diazomethane. The precipitate dissolves and after standing at room temperature for one hour, the solution is evaporated to dryness in vacuo and the residue crystallized from methanol-water, yield about 182 mg. of 17β-bromo-17-desoxyyohimbine, M.P. about 298–300° C., $[\alpha]_D^{24}$ +74.1° (pyridine).

*Analysis.*—Calcd. for $C_{21}H_{25}O_2N_2Br$ (417.25): C, 60.43; H, 6.04; N, 6.71; Br, 19.15. Found: C, 60.59; H, 5.89; N, 6.17; Br, 18.96. Neutral equivalent 416 (HClO4 titration).

EXAMPLE 3

*Ethyl 17β-bromo-17-desoxyyohimbate*

By following the procedure of Example 2 but substituting diazoethane for the diazomethane, ethyl 17β-bromo-17-desoxyyohimbate is obtained.

The invention may be otherwise variously embodied within the scope of the appended claims.

What is claimed is:

1. A process for preparing 17β-bromo-17-desoxyyohimbic acid which comprises interacting yohimbic acid β-lactone with an alkali metal bromide and recovering the 17β-bromo compound formed.

2. The process of claim 1 wherein the alkali metal bromide is lithium bromide.

References Cited in the file of this patent

Weisenborn: J. Am. Chem. Soc., vol. 79, pp. 4818–19, September 1957.